United States Patent
Hjelmström et al.

(10) Patent No.: US 8,848,198 B2
(45) Date of Patent: Sep. 30, 2014

(54) METHOD FOR DETERMINING THE TILT OF AN IMAGE SENSOR

(75) Inventors: Jonas Hjelmström, Staffanstorp (SE); Anders Johannesson, Hollviken (SE)

(73) Assignee: Axis AB, Lund (SE)

( * ) Notice: Subject to any disclaimer, the term of this patent is extended or adjusted under 35 U.S.C. 154(b) by 313 days.

(21) Appl. No.: 13/553,062

(22) Filed: Jul. 19, 2012

(65) Prior Publication Data

US 2013/0021617 A1    Jan. 24, 2013

Related U.S. Application Data

(60) Provisional application No. 61/510,344, filed on Jul. 21, 2011.

(30) Foreign Application Priority Data

Oct. 12, 2011 (EP) .................................... 11184903

(51) Int. Cl.
| | |
|---|---|
| G01B 11/02 | (2006.01) |
| G01M 11/02 | (2006.01) |
| H04N 17/00 | (2006.01) |
| G01B 11/27 | (2006.01) |

(52) U.S. Cl.
CPC ......... G01B 11/272 (2013.01); G01M 11/0221 (2013.01); H04N 17/002 (2013.01)
USPC ........................................................ 356/510

(58) Field of Classification Search
CPC .... G01B 11/26; G01B 11/27; G01B 9/02016; G01B 9/02061; G01M 11/0271
USPC .......................................................... 356/510
See application file for complete search history.

(56) References Cited

U.S. PATENT DOCUMENTS

| | | | |
|---|---|---|---|
| 2003/0223084 A1* | 12/2003 | Mehrl et al. ................. | 356/614 |
| 2003/0227615 A1 | 12/2003 | Montgomery et al. | |
| 2007/0159532 A1* | 7/2007 | Kiyokawa ..................... | 348/187 |
| 2008/0212105 A1* | 9/2008 | Restaino et al. .............. | 356/521 |

FOREIGN PATENT DOCUMENTS

JP    2004004842 A    1/2004

OTHER PUBLICATIONS

O Van Overschelde and M Wautelet "Self-diffraction in a CCD camera" Institute of Physics Publishing Eur. J. Phys. 26 (2005) L15-L17.
Fraser, Clive S. "Digital Camera Self-Calibration" ISPRS Journal of Photogrammetry & Remote Sensing, 52 (1997) pp. 149-159 Mar. 24, 1997 (XP007903128).
Wang, Clarke X. and Fryer, J.G. "The Principal Point and CCD Cameras" Photogrammertric Record 16 (92): pp. 293-312 (Oct. 1998).

* cited by examiner

*Primary Examiner* — Jonathan Hansen
(74) *Attorney, Agent, or Firm* — Volpe and Koenig, P.C.

(57) ABSTRACT

A method for determining a tilt of an image sensor surface plane in a camera in relation to a lens reference plane of the camera includes sending light onto the image sensor, receiving light reflected from the image sensor, identifying an interference pattern in the reflected light, identifying a feature of the interference pattern, and determining the tilt of the image sensor surface plane based on a position of the feature identified in the interference pattern.

15 Claims, 5 Drawing Sheets

METHOD FOR DETERMINING THE TILT OF AN IMAGE SENSOR

CROSS REFERENCE TO RELATED APPLICATIONS

This application claims priority to European Patent Application No. EP11184903.0 filed on Oct. 12, 2011, and claims the benefit of U.S. Provisional Application No. 61/510,344 filed on Jul. 21, 2011, which are incorporated by reference as if fully set forth.

FIELD OF INVENTION

The present invention relates to a method for determining the tilt of an image sensor in a camera.

BACKGROUND

The quality of images from cameras and in particular monitoring and surveillance cameras has increased and the requirement of even higher quality images also increases. These requirements have, among other things, resulted in that image sensors having increased number of pixels and decreased pixel pitch are implemented in the cameras. However, in order to achieve higher quality images other features than the number of pixels and the pixel pitch should be considered.

For example, increased number of pixels and the decreased pixel pitch in image sensors makes the image capturing devices increasingly sensitive to misalignments between the image sensor and the optics providing the image sensor with light representing the scene. Hence, the quality from increased number of pixels may be deteriorated if the image sensor is not mounted with high precision.

Today various different methods are used to measure the tilt of the image sensor in relation to the optical axis of the camera, i.e. the optical axis of a lens mounted to the camera.

One method includes use of "golden optics", i.e. substantially flawless optics. An image of a particular target is captured using the "golden optics" and then may the tilt of the sensor be determined by analysing the captured image. In another method the tilt is measured using a microscope utilising an extremely short depth of field in the microscope. In yet another method a laser beam is directed onto the image sensor along the optical axis of the camera and the reflection is checked for the deflection from the optical axis. One problem of this method is to identify the reflection from the image sensor as a plurality of reflections are created when shining a laser along the optical axis towards the image sensor and it is difficult to determine which one of the reflections that is originating from the image sensor.

SUMMARY

An improved method for determining the tilt of an image sensor mounted in a camera is achieved by means of a method for determining a tilt of an image sensor surface plane in a camera.

More specifically, according to one embodiment, a method for determining a tilt of an image sensor surface plane in a camera in relation to a lens reference plane of the camera comprises sending light onto the image sensor, receiving light reflected from the image sensor, identifying an interference pattern in the reflected light, identifying a feature of the interference pattern, and determining the tilt of the image sensor surface plane based on a position of the feature identified in the interference pattern.

The advantage of determining the tilt of the image sensor based on a feature of the interference pattern is that the determination becomes more reliable. The increased reliability is a result of the interference pattern originating from the reflection on the image sensor itself and not from any other reflective surface that may be arranged in the light path towards the image sensor. Hence, the risk of performing measurement on features resulting from other surfaces or means than the image sensor is minimized.

According to one embodiment the feature is an interference position of the interference pattern.

According to another embodiment the feature is the zeroth-order interference in the interference pattern.

In one embodiment the identifying of the zeroth-order interference is based on proximity to specular reflections from reflective surfaces in the path of the light sent onto the image sensor. Thereby is the identification of the zeroth-order interference within the interference pattern facilitated.

In another embodiment, the identifying of the zeroth-order interference is based on proximity to an expected position of the zeroth-order interference from a non tilted image sensor. One advantage of this embodiment is that it facilitates the identification of the zeroth-order interference within the interference pattern.

In a further embodiment, the tilt of the image sensor surface plane is determined by measuring the distance between the position of the feature of the interference and an expected position of the feature of the interference for a non tilted image sensor surface plane.

According to another embodiment, the tilt of the image sensor surface plane is determined by measuring the distance between the position of the feature of the interference and a predetermined center point being the point where an optical axis of a lens mounted on the camera during normal operation intersects with an analysis surface.

According to one embodiment, the determining of the tilt of the image sensor surface plane comprises determining a first position of the identified interference feature, turning the camera substantially 180 degree around an axis being perpendicular to the lens reference plane, determining, after the rotating of the camera, a second position of the interference feature, and determining the tilt of the image sensor surface plane based on the distance between the first position and the second position of the interference feature. The advantage of this embodiment is that the tilt may be determined without the need of identifying a precise center point for relating the position of the interference feature to in order to determine the tilt. Thereby, uncertainty relating to the precision of such center point may thus be avoided and the result may be more reliable.

In a further embodiment, the lens reference plane is a plane being perpendicular to an optical axis of a lens mounted to the camera during normal operation.

In one embodiment, the method further comprises attaching the camera to a test rig arranging the lens reference plane substantially parallel an analysis surface.

According to another embodiment, the position of an interference feature is determined on an analysis surface.

In one embodiment, the analysis surface includes a surface that enables visible presentation of the light reflected from the camera. The advantage of visible presentation is that the analysis may be performed by a person looking at the surface and that the analysis may be achieved in a reasonably uncomplicated device. Hence, the cost of such device may be low.

In another embodiment, the analysis surface includes an image sensor arranged to detect the light reflected from the camera. This embodiment is advantageous in that no person have to monitor and analyze the result.

According to one embodiment, the light sent onto the image sensor is monochromatic light.

According to another embodiment, the light sent onto the image sensor is laser light.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description. Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a sensor" or "the sensor" may include several sensors, and the like. Furthermore, the word "comprising" does not exclude other elements or steps.

BRIEF DESCRIPTION OF THE DRAWINGS

Other features and advantages of the present invention will become apparent from the following detailed description of an embodiment, with reference to the accompanying drawings, in which.

Further, in the figures like reference characters designate like or corresponding parts throughout the several figures.

DETAILED DESCRIPTION

Figure 1:
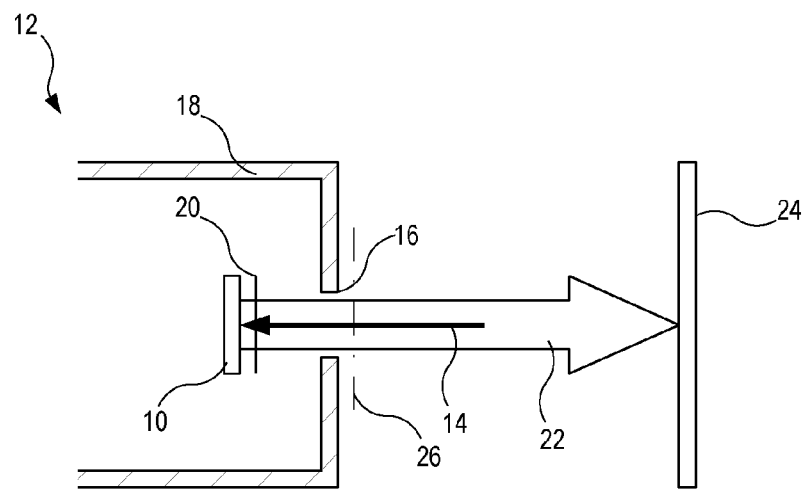
FIG. 1 is a schematic diagram depicting structures and light paths according to one embodiment of the invention.

The present invention relates to inspection of cameras and in particular to a process of checking a tilt of an image sensor in a camera. Now referring to FIG. 1, the checking of the tilt of the image sensor 10 in the camera 12 according to one embodiment of the invention includes sending light 14 through an image capture opening 16 in the camera body 18 and onto the image sensor 10. The light 14 may, depending on the design of the camera, travel through one or plurality of transparent plates or objects 20. The light 14 sent into the image capture opening will then be reflected by the image sensor 10 and the transparent plate 20, the reflected light 22 is illustrated in the figure with an arrow returning from the image sensor 10 and the transparent plate 20. The reflection is then captured on an analysis surface 24 where the resulting pattern of reflections may be analysed.

The light 14 sent into the camera 12 and onto the image sensor 10 may be transmitted onto the image sensor by means of a narrow band light source, a monochromatic light source or a laser.

According to one embodiment, the light 14 is sent into the camera along an axis having a direction being perpendicular to a lens reference plane 26. In the context of the present invention, the lens reference plane 26 is a plane being perpendicular to the optical axis of a lens mounted to the camera during normal operation. Hence, the lens reference plane may in many cases be related to a lens mount of the camera, which defines the direction of the optical axis of the lens mounted onto the camera.

The basic idea of the invention is to check the tilt of the image sensor 10 in relation to the lens reference plane 26 in order to assure the quality of the camera 12. If the tilt of the image sensor 10 is too great, the images captured by the image sensor will be of poor quality. The amount of tilt that is seen as resulting in poor quality images is subjective. However, in many surveillance applications tilting the image sensor 0.5-1 degree often results in quality too poor for practical use. By means of the invention, it is possible to detect a tilt angle in the order of 0.1 degrees. This type of check may be performed for every single camera in a series or for a random sample.

Figure 2:
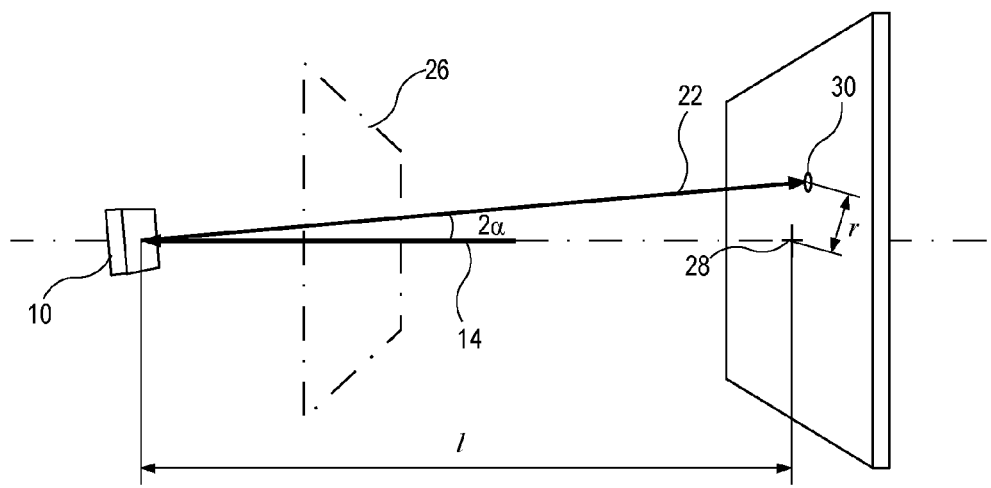
FIG. 2 is a schematic diagram depicting the effect on a light beam reflected from a tilted surface, e.g. image sensor.

According to one embodiment, the checking of the tilt of the image sensor 10 is performed by sending in light 14 onto the image sensor 10 and then determining the tilt of the image sensor 10 from the reflection 22 of the light from the image sensor 10, see FIG. 2. An image sensor 10 is determined to be tilted when the light detecting plane of the image sensor is not parallel to a lens reference plane. This tilt of the sensor may be determined by detecting the deviation between the light 14 sent onto the image sensor 10 and the reflection of this light 22. In FIG. 2, the light reflected from the image sensor is reflected at an angle $2\alpha$ in relation to the light 14 sent towards the image sensor. By detecting this angle between the light 14 sent onto the image sensor 10 and the reflection 22, the tilt angle of the image sensor 10 in relation to the lens reference plane 26 may be determined. If the light 14 sent onto the image sensor is sent in a direction perpendicular to the lens reference plane, then the tilt angle $\alpha$ of the image sensor in relation to the lens reference plane is half the angle $2\alpha$ between the light 14 sent towards the image sensor 10 and the reflected light 22. The relation between the tilting angle $\alpha$, the distance l between the image sensor 10 and the analysis surface, and the distance r between the ideal position 28 of the light reflected from the image sensor 10 and the actual position 30 light reflected from the image sensor 10 may be represented by:

$$\tan(2\alpha) = \frac{r}{l} \qquad \text{Equation 1}$$

Hence, the tilt angle $\alpha$ of the image sensor may be expressed as:

$$\alpha = \frac{\arctan\left(\frac{r}{l}\right)}{2} \qquad \text{Equation 2}$$

However, this reflection from the image sensor may be difficult to identify because the light sent onto the image sensor 10 results in a plurality of reflections and not all is reflections from the image sensor 10. At least some of these reflections are likely to result from reflection of the light from transparent material present in the path that the light is travelling. In some cameras, there are glass disks or plates present in the optical path and one such disk may very well create one reflection at the surface where the light enters the glass disk and one reflection at the surface where the light exits the glass disk.

Figure 3:
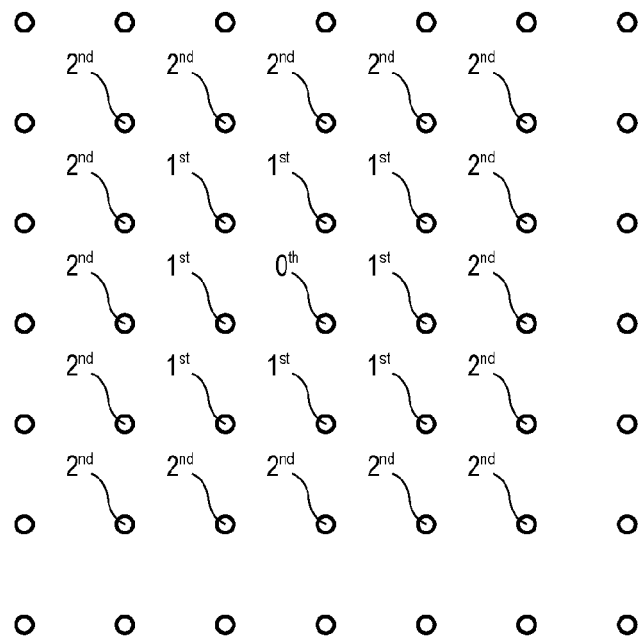
FIG. 3 is a schematic diagram depicting a central portion of an interference pattern.

According to one embodiment, an interference pattern is identified. The interference pattern is a result of the light reflecting from the image sensor which includes a plurality of densely packed light detecting cells. These cells then make the image sensor act as a reflection grating producing an interference pattern. In the case of the image sensor, the resulting interference pattern forms a matrix of interference patches, see FIG. 3. In some image sensors, additional reflections and patterns may be reflected from the image sensor. In the interference pattern, one of the patches of the interference pattern corresponds to a direct reflection or in other terms a specular reflection, referred to as "$0^{th}$" in FIG. 3. This direct reflection $0^{th}$ is often referred to as the zeroth-order interference. The patches next to the zeroth-order interference $0^{th}$ are referred to as first order interferences $1^{st}$ and the patches next to the first order interferences $1^{st}$ but further away from the zeroth-order interference $0^{th}$, are referred to as second order interferences $2^{nd}$.

Figure 4:
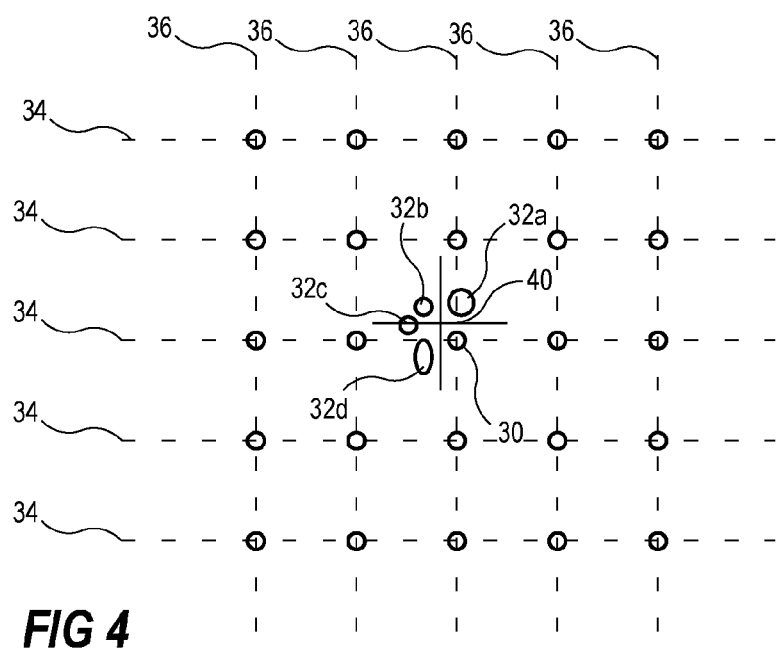
FIG. 4 is a schematic diagram depicting a central portion of an interference pattern and reflections from other surfaces in the path of the light sent towards the image sensor.

Accordingly, the interference pattern is a reflection produced by the image sensor and therefore any one of the patches in the interference pattern may potentially be used in order to determine the tilt of the image sensor. However, according to one embodiment of the invention, the zeroth-order interference is used to determine the tilt of the image sensor, as it corresponds to a direct reflection at the image sensor surface, e.g. as a direct reflection from a mirror surface, and therefore the zeroth-order interference may be used in the equations for calculating the tilt presented above. Now referring to FIG. 4, the problem of distinguishing the reflection from the image sensor from all the reflections 32a-d from other surfaces in the light path may be solved by utilizing the fact that the zeroth-order interference 30 from the image sensor is part of the interference pattern and may thereby be identified among the other reflections. This may be achieved by relating each of these reflections to the light patches being part of the interference pattern produced by the image sensor and identifying the reflection that most likely forms part of the interference pattern. The act of relating each of these reflections to the light patch may be as simple as identifying imaginary lines 34, 36 connecting interference positions of the interference pattern in lines 34 and columns 36 and then identifying the reflection among the plurality of reflection.

Hence one way to identify the zeroth-order interference in order to determine the tilt angle of the image sensor is to find a cluster of reflections, as the zeroth-order interference is likely to be closer to these other reflections than any of the other order interferences. When the likely candidates have been found, one only needs to identify which one of the reflections of the cluster that belongs to the interference pattern. The reason for the zeroth-order interference being close to the other reflections is that the tilt angles of the image sensor and the other surfaces resulting in reflections are quite small and that the distance between interference positions in the interference pattern are substantially greater than the distance between the reflections and the zeroth-order interference resulting from tilting of these surfaces.

Figure 5:
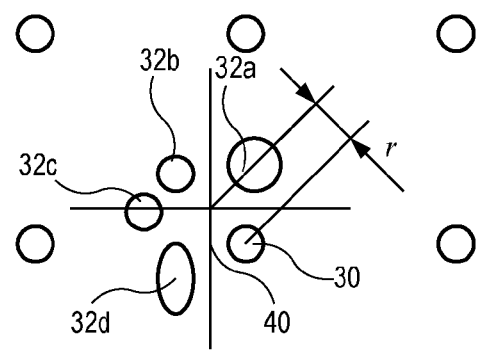
FIG. 5 is a schematic diagram showing a distance to be measured according to one embodiment of the invention.

Yet another way to identify the zeroth-order interference is to identify the light patch closest to a center marker 40, which indicates the position where an ideal reflection from a non tilted surface or image sensor would illuminate the analysis surface, see FIG. 5. This is a valid assumption because the tilting angle of the image sensor is unlikely to be of such magnitude that that the position of another one of the reflection interferences is closer to the center marker than the zeroth-order interference.

When the reflections or reflection interferences originating from the image sensor has been identified, then the tilting of the image sensor may be determined based on one or a plurality of these features resulting from shining of light onto the image sensor.

According to one embodiment, the tilting angle of the image sensor may be indicated by the distance r from a center marker 40 to the zeroth-order interference 30, see FIG. 5. The distance r may be used to calculate a tilting angle or, alternatively, a value for r may represent an acceptable tilting angle which is not to be exceeded.

Figure 6:
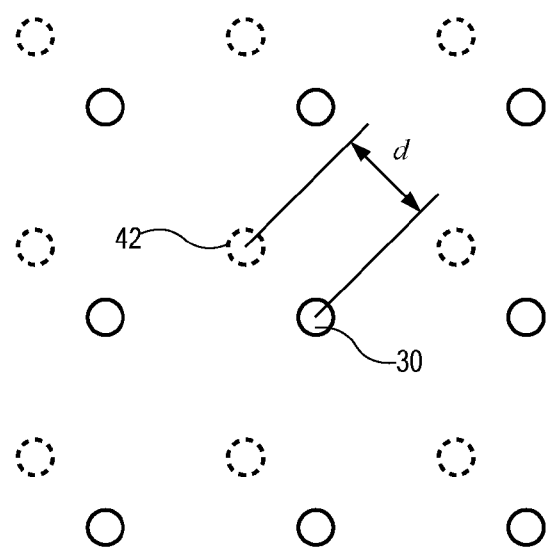
FIG. 6 is a schematic diagram showing a distance to be measured according to another embodiment of the invention.

According to another embodiment, see FIG. 6, the position 30 of the zeroth-order interference is identified and registered, then the camera is turned 180 degrees around an axis that is perpendicular to the lens reference plane, e.g. the optical axis of a lens mounted on the camera in order to focus light on the image sensor. Thereby the interference pattern also becomes turned 180 degrees, see the dashed patches in FIG. 6, and en the position 42 of the zeroth-order interference when the camera is turned 180 degrees is registered. The distance d between the two positions 30, 42 of respective zero-order interference corresponds to double the distance r used in the equations and embodiments above. Hence, in this embodiment the distance d=2r and the ideal point for a reflection from a non tilted image sensor should be half the distance between the two positions 30, 42 of the registered zero-order interferences. Then, the result from this type of measurement may be used in a way as described above in order to determine the tilt angle or if the tilt angle exceeds some predetermined value.

Figure 7:
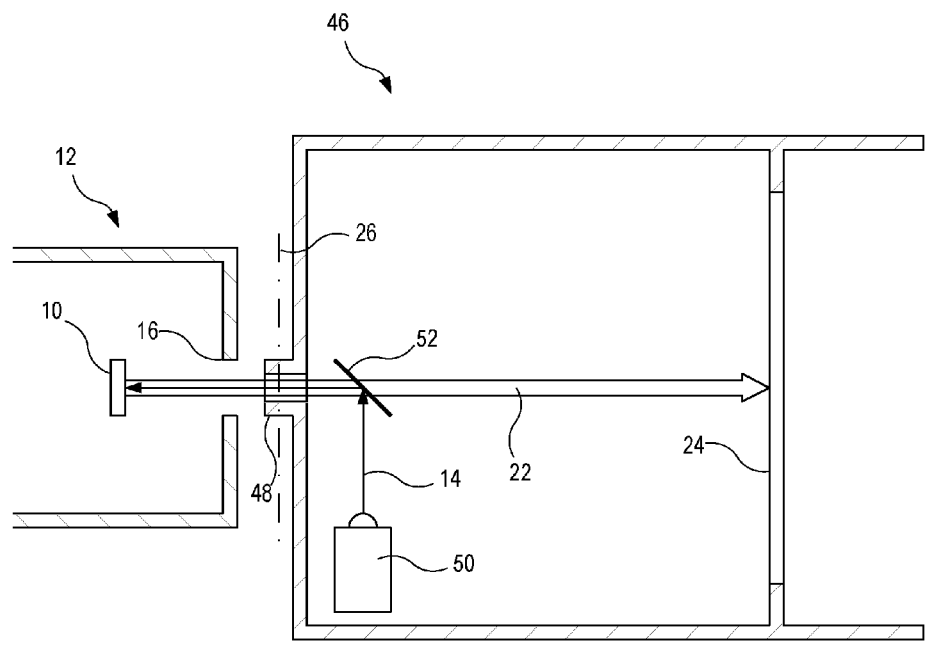
FIG. 7 is a schematic diagram of an arrangement for performing the invention according to one embodiment.

Now referring to FIG. 7, one embodiment of a test rig 46 for performing a determination of the tilt of an image sensor in a camera includes a analysis surface 24, a camera interface 48 for mounting the camera to the test rig 46, a light source 50, a semi transparent mirror 52 for reflecting light 14 from the light source 50 into the camera 12 and onto the image sensor 10 of the camera 12 and for letting reflected light 22 from the camera 12 pass through the mirror 52 onto the analysis surface 24. The camera 12 is mounted in the test rig so that a lens reference plane 26 of the camera 12 is substantially parallel to the analysis surface 24. One way of achieving a lens reference plane parallel to the analysis screen is to mount the camera to the test rig using the lens mount or other lens fixing means of the camera.

The test rig may be manually operated. In manual operation, the analysis screen may be monitored by the operator and the features used in the determination of the tilt of the image sensor 10 may be measured. Alternatively, the analysis screen 24 may present a test pattern indicating acceptable positions of a zeroth-order interference and the position patches relating to one other order of interference in order to find the zeroth-order interference by relating the zeroth-order interference to at least a part of the rest of the interference pattern.

Figure 8:
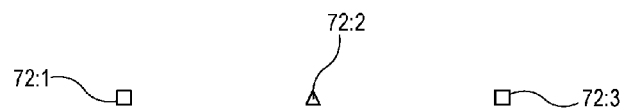
FIG. 8 is a schematic diagram showing a test pattern to be used in accordance with one embodiment of the invention.

One such test pattern is depicted in FIG. 8. The pattern includes a central tilt indicating zone 70 and aligning points 72:1-8. The central tilt indicating zone 70 may be of such shape and size that an acceptable tilt is indicated if the position of the zeroth-order interference is within the central tilt indicating zone 70. If the central tilt indicating zone 70 is circular, then the radius of this circle may be determined using Equation 1 above, setting the length l equal to the distance between the analysis surface and the sensor surface and the tilt angle α to the angle of maximal acceptable tilt. In order to confirm that the light patch studied is the zeroth-order interference, the first order interference pattern may be aligned with the aligning points 72:1-8.

According to another embodiment, the analysis surface of FIG. 7 is curved and according to one particular embodiment the surface is spherically curved.

According to yet another embodiment, the analysis surface of FIG. 7 includes an image sensor arranged to detect the reflected light and enable automatic performing of analyzing the tests.

Moreover, the light source of the test rig in FIG. 7 may alternatively be arranged behind the analysis surface and sending its light through a small hole in the analysis surface. In such an embodiment, the semi transparent mirror may be omitted.

Figure 9:
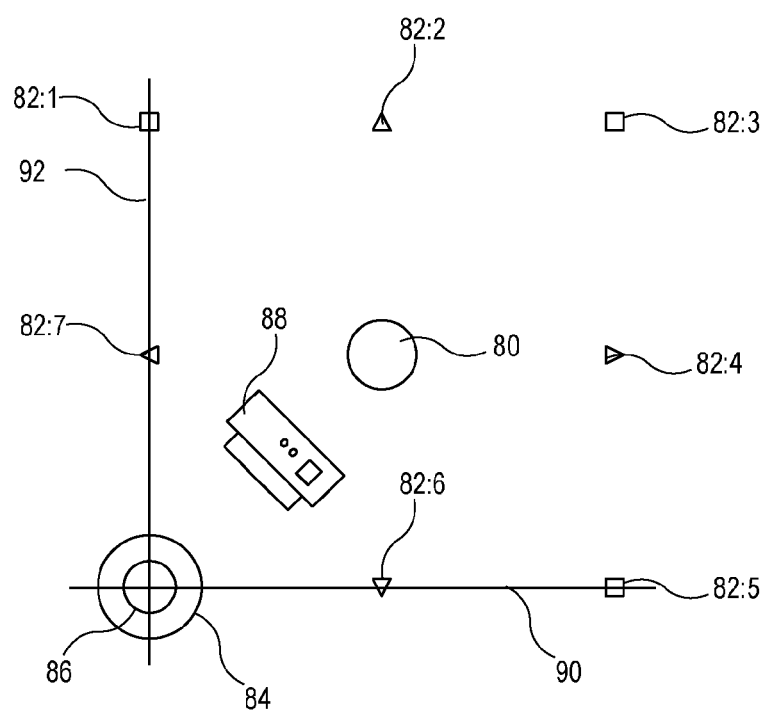
FIG. 9 is a schematic diagram showing a test pattern to be used in accordance with another embodiment of the invention.

Below one specific embodiment of the method for determining the tilt of the image sensor of a camera is described. Initially, any lens mounted on the camera is removed. The camera to be tested is positioned with its lens thread touching a thread of the rig. The thread of the rig has a cylindrical surface to guide the camera tested. The camera is screwed on to the threads. The lens thread mentioned may alternatively be any other lens mounting structure. A target, e.g., the test pattern shown in FIG. 9, is positioned on the analysis surface. The circle 80 in the middle is for marking where the center points from the camera appear. The circle 84 (also called an acceptance circle) in the lower left corner marks the acceptance criteria for this particular embodiment. The smaller shaded circle inside it 86 is to mark half the angle of the acceptance criteria. The squares 82:1, 82:3, 82:5 mark where the corner dots of the measuring dots are to be positioned and the triangles 82:2, 82:4, 82:6, 82:7 mark where the side dots will be. In one embodiment, these dots that are related to the markings 82:1-7 on the test pattern belong to the first order interference. However, higher order interference dots may be used. The camera silhouette 88 is for orienting the target so that it is possible to determine in which direction the error is. On the analysis surface, there will be several dots. An Iris Cover, not shown, may reduce the number of dots, but there will still be some irrelevant dots. The center dots are sometimes missing or partially missing due to a hole in the internal mirror of the rig.

One way of increasing the likelihood that the correct dots are used for measuring is to follow the below steps. Orient the camera silhouette 88 so that it fits the orientation of the camera being measured. Place the middle circle 80 approximately around the middle dots. Place the center of the circle 84 on the nearest corner dot. Adjust the target so that the corner dot diagonally opposite from the corner dot in the circle 84 is on the line and in the square 82:3. Check that the other corner dots are in the squares 82:1, 82:5 and that the side dots are in the triangles 82:2,4,6,7. Check once more that the corner dot in the circle 84 is exactly in the center of the circle 84.

Then the camera is turned 180 degrees around the optical axis of the camera, i.e., an axis perpendicular to the lens reference plane and thereby also perpendicular to the analysis surface. The unit is not allowed to come loose from the thread. Note the new location of the dots. Two imaginary lines drawn through the present dots should be parallel to the long lines 90, 92 in the target. If the imaginary lines are not parallel to the long lines 90, 92, the unit has not been turned 180°, or the target has moved or not been correctly placed. If this happens, the measurement is not valid and must be performed again.

If the imaginary lines are parallel to the long lines 90, 92 then note the position of the corner dot now closest to the circle 84. If this dot is inside the circle 84, the camera is approved in relation to image sensor tilt. If this dot is outside of the circle 84, the camera is not approved.

What is claimed is:

1. A method for determining a tilt of an image sensor surface plane in a camera in relation to a lens reference plane of the camera, the method comprising:
    sending light onto the image sensor;
    receiving light reflected from the image sensor;
    identifying an interference pattern in the reflected light;
    identifying a feature of the interference pattern; and
    determining the tilt of the image sensor surface plane based on a position of the feature identified in the interference pattern.

2. The method according to claim 1, wherein the feature is an interference position of the interference pattern.

3. The method according to claim 1, wherein the feature is the zeroth-order interference in the interference pattern.

4. The method according to claim 3, wherein the identifying of the zeroth-order interference is based on proximity to specular reflections from reflective surfaces in the path of the light sent onto the image sensor.

5. The method according to claim 3, wherein the identifying of the zeroth-order interference is based on proximity to an expected position of the zeroth-order interference from a non tilted image sensor.

6. The method according to claim 1, wherein the tilt of the image sensor surface plane is determined by measuring the distance between the position of the feature of the interference and an expected position of the feature of the interference for a non tilted image sensor surface plane.

7. The method according to claim 1, wherein the tilt of the image sensor surface plane is determined by measuring the distance between the position of the feature of the interference and a predetermined center point being the point where an optical axis of a lens mounted on the camera during normal operation intersects with an analysis surface.

8. The method according to claim 1, wherein the determining of the tilt of the image sensor surface plane comprises:
    determining a first position of the identified interference feature;
    turning the camera substantially 180 degrees around an axis being perpendicular to the lens reference plane;
    determining, after the rotating of the camera, a second position of the interference feature; and
    determining the tilt of the image sensor surface plane based on the distance between the first position and the second position of the interference feature.

9. The method according to claim 1, wherein the lens reference plane is a plane being perpendicular to an optical axis of a lens mounted to the camera during normal operation.

10. The method according to claim 1, further comprising attaching the camera to a test rig arranging the lens reference plane substantially parallel an analysis surface.

11. The method according to claim 1, wherein the position of an interference feature is determined on an analysis surface.

12. The method according to claim 11, wherein the analysis surface includes a surface that enables visible presentation of the light reflected from the camera.

13. The method according to claim 11, wherein the analysis surface includes an image sensor arranged to detect the light reflected from the camera.

14. The method according to claim 1, wherein the light sent onto the image sensor is monochromatic light.

15. The method according to claim 1, wherein the light sent onto the image sensor is laser light.

* * * * *